Patented Feb. 7, 1939

2,146,475

UNITED STATES PATENT OFFICE

2,146,475

PREPARATION OF β-(P-HYDROXYPHENYL)-ISOPROPYLMETHYLAMINE

Gustav Hildebrandt, Mannheim, Germany, assignor to E. Bilhuber Inc., Jersey City, N. J.

No Drawing. Application May 24, 1937, Serial No. 144,547. In Germany May 26, 1936

4 Claims. (Cl. 260—574)

The present invention relates to an improved process for the preparation of β-(p-hydroxyphenyl)-isopropylmethylamine.

It has already been proposed to prepare β-(p-methoxyphenyl)-isopropylmethylamine by treating p-methoxybenzylmethyl ketone with reagents which yield formic acid and methylamine. The formyl compound of β-(p-methoxyphenyl)-isopropylmethylamine is produced and is saponified with dilute mineral acids. According to another proposal β-(p-hydroxyphenyl)-isopropylmethylamine may be obtained from β-(p-methoxyphenyl)-isopropylmethylamine by eliminating the methoxy group with strong acids.

The applicant has carried out this known process and ascertained that by boiling p-methoxybenzylmethyl ketone with sodium formate and methylamine hydrochloride in the presence of formic acid and saponifying the resulting formyl compound with dilute mineral acids β-(p-methoxyphenyl)-isopropylmethylamine can at best be obtained in a yield of 40%. If methylamine formate is used instead of methylamine hydrochloride and sodium formate the yield of β-(p-methoxyphenyl)-isopropylmethylamine is increased to 53%. By eliminating the methoxy group from the resulting β-(p-methoxyphenyl)-isopropylmethylamine by heating the latter with strong acids the β-(p-hydroxyphenyl)-isopropylmethylamine can be obtained in yields from 36% up to 48%.

According to this invention it has been found that β-(p-hydroxyphenyl)-isopropylmethylamine can be prepared in a substantially more simple manner and in considerably better yields by starting from p-hydroxybenzylmethyl ketone, condensing this with ammonia, thereafter or simultaneously reducing the product of condensation and finally methylating the resulting base at the nitrogen atom in a manner known per se.

The β-(p-hydroxylphenyl)-isopropylmethylamine can in this way be prepared in yields of more than 90%, whereas according to the known processes the best yields obtainable are 48%.

The process of this invention also enables formic acid to be dispensed with, which owing to its corrosive action on almost all technical materials constitutes an undesirable reaction component.

Example 30 gms. of p-hydroxybenzylmethyl ketone, 370 ccs. of methyl alcohol containing 7.7 gms. of ammonia and 50 gms. of nickel catalyst are stirred for 2 to 3 hours at 80° C. and 20 atmospheres with hydrogen in a stirring autoclave. After separating from the catalyst and washing with alcohol, the solution is acidified with hydrochloric acid and evaporated to dryness, the residue is dissolved in a small quantity of water and the resulting solution is precipitated with potassium carbonate solution. The precipitate is separated by suctional filtration and washed with a small quantity of water.

Yield: 30.8 gms of base=97% of theory.

β-(p-hydroxyphenyl)-isopropylmethylamine is obtained by methylating the base with formaldehyde and hydrogen or with benzaldehyde and methyl iodide.

What I claim is:

1. A process for the preparation of β-(p-hydroxyphenyl)-isopropylmethylamine, which consists in condensing p-hydroxybenzylmethyl ketone with ammonia, reducing the condensation product at the nitrogen atom to form the corresponding saturated amine and methylating the resulting base at the nitrogen atom.

2. A process according to claim 1, wherein the condensation with ammonia and the reduction of the condensation product are effected simultaneously.

3. A process according to claim 1, wherein the condensation of the ketone with ammonia and the reduction of the condensation product are effected consecutively.

4. A process for the preparation of β-(p-hydroxyphenyl)-isopropylmethylamine, which consists in condensing p-hydroxybenzylmethyl ketone with ammonia, hydrogenating the condensation product at the nitrogen atom to form the corresponding saturated amine and methylating the resulting base at the nitrogen atom.

GUSTAV HILDEBRANDT.